(12) United States Patent
Walters et al.

(10) Patent No.: US 12,101,314 B1
(45) Date of Patent: Sep. 24, 2024

(54) LOW LATENCY AND REDUNDANT PROOF OF POSSESSION FOR CONTENT SUBSCRIPTION

(71) Applicant: Stodge Inc., Scottsdale, AZ (US)

(72) Inventors: Jerry Dilan Walters, Richmond, VA (US); Kameron Ahler, Denver, CO (US); Kristine Tanya Moskalets, Sammamish, WA (US); Miles Drew Everest, Seattle, WA (US); Nicole Marie Perry, Oakland, CA (US); Thomas James Cuevas, Havertown, PA (US); Siddharth Pathela, Brampton (CA); Vanessa Nerin Katz, Portland, OR (US)

(73) Assignee: Stodge Inc., Scottsdale, AZ (US)

( * ) Notice: Subject to any disclaimer, the term of this patent is extended or adjusted under 35 U.S.C. 154(b) by 0 days.

(21) Appl. No.: 18/419,515

(22) Filed: Jan. 22, 2024

Related U.S. Application Data

(60) Provisional application No. 63/618,249, filed on Jan. 5, 2024, provisional application No. 63/596,605, filed on Nov. 6, 2023, provisional application No. 63/542,736, filed on Oct. 5, 2023, provisional application No. 63/578,960, filed on Aug. 25, 2023, provisional application No. 63/518,083, filed on Aug. 7, 2023.

(51) Int. Cl.
*H04L 29/06* (2006.01)
*G06F 7/58* (2006.01)
*H04L 9/40* (2022.01)

(52) U.S. Cl.
CPC .......... *H04L 63/0838* (2013.01); *G06F 7/582* (2013.01)

(58) Field of Classification Search
None
See application file for complete search history.

(56) References Cited

U.S. PATENT DOCUMENTS

| | | | |
|---|---|---|---|
| 9,084,071 B2 * | 7/2015 | Lisboa | H04W 60/00 |
| 9,218,613 B2 * | 12/2015 | Dinardo, Sr. | G06Q 30/0267 |
| 11,829,508 B2 * | 11/2023 | Patel | H04W 12/02 |
| 11,935,068 B1 * | 3/2024 | Long | H04L 67/146 |
| 11,966,909 B2 * | 4/2024 | Foster, Jr. | H04W 4/14 |
| 2013/0066722 A1 * | 3/2013 | Alkatib | G06Q 30/0203 |
| | | | 705/14.64 |
| 2014/0006158 A1 * | 1/2014 | Cooper | G06Q 30/02 |
| | | | 705/14.56 |

(Continued)

OTHER PUBLICATIONS

GetFondue.com [online], "CashBack 101: What is CashBack?," Sep. 14, 2022, retrieved on Feb. 13, 2024, retrieved from URL<https://www.getfondue.com/blog/cashback-101-what-is-cashback>, 6 pages.
Postscript.io [online], "Why Fondue CashBack is the Better Coupon Alternative," Jul. 11, 2023, retrieved on Feb. 13, 2024, retrieved from URL<https://postscript.io/blog/why-cashback-is-the-better-coupon-alternative>, 10 pages.

(Continued)

*Primary Examiner* — Jeffery L Williams
(74) *Attorney, Agent, or Firm* — Fish & Richardson P.C.

(57) ABSTRACT

Methods, systems, and apparatus, including computer programs encoded on computer storage media, for mitigating computing latency associated with proving of possession of network endpoints. One system includes (i) a user device, e.g., a smartphone or a personal computer, (ii) a proof of possession service running on one or more computers, and (iii) an authorization service running on one or more computers.

14 Claims, 6 Drawing Sheets

(56) References Cited

U.S. PATENT DOCUMENTS

| | | | | |
|---|---|---|---|---|
| 2014/0156407 | A1* | 6/2014 | Dinardo, Sr. | H04L 12/189 705/14.56 |
| 2016/0012465 | A1* | 1/2016 | Sharp | G06Q 20/321 705/14.17 |
| 2017/0039597 | A1* | 2/2017 | Trinh | G06Q 30/0251 |
| 2019/0281454 | A1* | 9/2019 | Cheung | H04L 63/0853 |
| 2021/0056500 | A1* | 2/2021 | Gilman | G06Q 20/3274 |
| 2022/0198431 | A1* | 6/2022 | Foster, Jr. | G06Q 20/322 |
| 2023/0281668 | A1* | 9/2023 | Friborg, Jr. | H04W 4/14 705/14.55 |
| 2023/0376987 | A1* | 11/2023 | Doumar | G06F 16/9558 |
| 2024/0015806 | A1* | 1/2024 | Kahn | H04W 12/069 |
| 2024/0061957 | A1* | 2/2024 | Morales | G06F 21/602 |
| 2024/0086970 | A1* | 3/2024 | Thompson | G06Q 30/0269 |
| 2024/0113990 | A1* | 4/2024 | Palraj | H04L 51/02 |
| 2024/0121236 | A1* | 4/2024 | Buchler | H04L 63/083 |
| 2024/0126514 | A1* | 4/2024 | Meyer | G06F 8/34 |
| 2024/0161140 | A1* | 5/2024 | Doumar | H04L 51/02 |

OTHER PUBLICATIONS

Twilio.com [online], "Verify Silent Network Auth Technical Overview," available on or before Aug. 9, 2022, via Internet Archive: Wayback Machine URL<https://web.archive.org/web/20220809035742/https://www.twilio.com/docs/verify/sna/tech-overview>, retrieved on Feb. 13, 2024, URL<https://www.twilio.com/docs/verify/sna/tech-overview>, 5 pages.

Twilio.com [online], "What is Silent Network Authentication?," Aug. 2, 2022, retrieved on Feb. 13, 2024, retrieved from URL<https://www.twilio.com/blog/silent-network-authentication-sna-overview#technical-overview>, 11 pages.

Whatwg.org [online], "DOM Living Standard," available on or before Jan. 11, 2012, via Internet Archive: Wayback Machine URL<https://web.archive.org/web/20120111115233/https://dom.spec.whatwg.org/>, retrieved on Feb. 13, 2024, URL<https://dom.spec.whatwg.org/>, 147 pages.

* cited by examiner

LOW LATENCY AND REDUNDANT PROOF OF POSSESSION FOR CONTENT SUBSCRIPTION

CROSS-REFERENCE TO RELATED APPLICATIONS

This application claims the benefit under 35 U.S.C. § 119(e) of the filing dates of U.S. Patent Applications No. 63/518,083 filed on Aug. 7, 2023; No. 63/578,960 filed on Aug. 25, 2023; No. 63/542,736 filed on Oct. 5, 2023; No. 63/596,605 filed on Nov. 6, 2023; and No. 63/618,249 filed on Jan. 5, 2024. All of the foregoing patent applications are incorporated here by reference.

BACKGROUND

This specification relates to information management and latency mitigation during HTTP sessions of networked devices.

Network devices exchange computing resources using an application layer protocol known as HTTP (Hypertext Transfer Protocol), usually in a client-server relationship where the client is generally a device that has software requesting computing resources, which may collectively be referred to as a client, and a server is generally one or more computers programmed to interact with clients and to provide computing resources. One device can be both a server and a client, depending on the computing process it is performing. A client can request resources from multiple servers, and a server can provide resources to multiple clients. Computing resources can include data and/or logic that provides functionality, information, amongst other benefits.

In the context of web applications, mobile and desktop devices are generally client devices, having client-side software installed or running on them, and computing processes executing on mobile and desktop devices may be called client-side processes. Mobile applications can perform one or more computing processes to provide various practical applications. Examples of mobile applications include web browsers, email applications, social media applications, and text messaging applications.

One example of a computing resource stored on and provided by a server is an HTML document, which may be stored as or in a file, which document a web browser running on a user device, e.g., a mobile device, an electronic tablet, or a desktop computer, can render and generally display as a web page. Here, the web browser and any HTML code is the client and the user device is a client device.

An HTML document includes HTML elements, examples of which include an iFrame element and a script element. The iFrame element embeds one HTML document within another, which in turn allows the display, on screen of a mobile device, of one web page within another web page. Popups are common implementations of window embedding. Generally, a popup is a pane or banner, generally a small one, that appears in the foreground of a parent web page.

The script element is another HTML element. It generally contains browser-interpretable instructions and data that make the HTML document more dynamic. Besides its local instructions, a script element may reference, by URL or more generally URI, instructions as well as other resources that are remote, typically server-side.

Another example of a computing resource is library code from a software development kit (SDK), which provides development tools helpful to application developers of a particular platform. This library code usually includes one or more application programming interfaces (APIs) and calls to one or more APIs for a service corresponding to the SDK. At development time, SDK code is included in HTML documents or, for mobile applications other than browsers, their code base. The library code enhances the functionality of the mobile applications, often by leveraging server-side resources using one or more APIs of the server-side resources. SDK code may, for example, supplement an HTML document with new iFrame elements and/or new script elements.

As used in this specification, the term "digital address" refers to a user's network accessible endpoint at which information sent to the user is received. Examples of a digital address include, e.g., a mobile phone number, an email address, an account identifier of a text messaging application, and account identifiers of social media applications, which can have text messaging functionality, e.g., a direct message.

Users can provide their endpoints to services to subscribe to receive content from the services. For example, one can subscribe to receive notifications that there is new content on a social media platform or there is a new email message.

Moreover, endpoints can be used for information security. Proof of possession of a network endpoint, e.g., a mobile phone number, by a user means, in general, that the user has the right to receive messages at the end point in question, e.g., she has control or ownership over the endpoint. This proof is sometimes necessary to prevent fraud, e.g., subscribing another person's digital address to register for an imposter social media account or registering another person's mobile phone number to receive notifications.

SUMMARY

Proving that a user has ownership or control over an endpoint, called "proof of possession," is a best practice or requirement under many circumstances, for example, for information security, or for compliance with industry standards or legal obligations, e.g., when a user requests notifications and alerts for a social media platform, requiring proof that the user has ownership or control of the relevant platform. The term "proof of possession" encompasses, for example, proof of possession by a user of a network endpoint, e.g., a static network address of a user device or a mobile phone number.

A system implemented in accordance with this specification provides proof of possession along with other online services for which the former is required or recommended, e.g., e-commerce, advertising, social media, as well as other forms of content distribution and information retrieval. The system improves computing efficiency and mitigates latency caused by computing tasks related to proof of possession. It optionally can start the process before user selection by inferring user intent based on user engagement, as will be further described below.

The system can perform proof of possession deterministically or, as an option, heuristically. An example of a deterministic process includes providing a one-time password ("OTP") that is sent to the digital endpoint in question, in response to a proof-of-possession challenge. Here, the system provides, to an appropriate registrar, device or session information that has been registered and stored with the endpoint in question. If the device or session information and the endpoint matches those of record, then the registrar returns a confirmation to the system.

A heuristic process, which can optionally supplement or replace a deterministic one, where permitted by law, leverages multiple signals to infer that a user in question does have possession of the endpoint in question. Signals include, for example, one or more of geolocation as determined by GPS, cellular station, or other geolocation information, TCP/IP and/or MAC address of mobile device or WiFi router, account identifiers, session information, or logs of previous engagements. The system implements rule-based as well as machine learning models, generally classifiers and/or regression models, to heuristically perform proof of possession.

The system optionally includes different criteria to accommodate the varieties of industry self-regulatory and legal requirements across legal jurisdictions. For example, one set of criteria implements strictly deterministic processes, a second set of criteria implements only heuristic processes, and a third set implements both.

The technology described in this specification can be implemented so as to realize one or more of the following advantages. Proof of possession happens in session and onsite and hence does not require the user to switch away from a web page generated by the browser or a mobile application, e.g., to switch away in order to send a text message. Latency is mitigated, and so the risk of a user losing interest in, or being interrupted in, a transaction or activity that requires proof of possession is mitigated. Proof of possession does not rely on just one registrar and hence works when the mobile device is connected to either a cellular network or through WiFi.

BRIEF DESCRIPTION OF THE DRAWINGS

Like reference numbers and designations in the various drawings indicate like elements.

DETAILED DESCRIPTION

Figure 1:
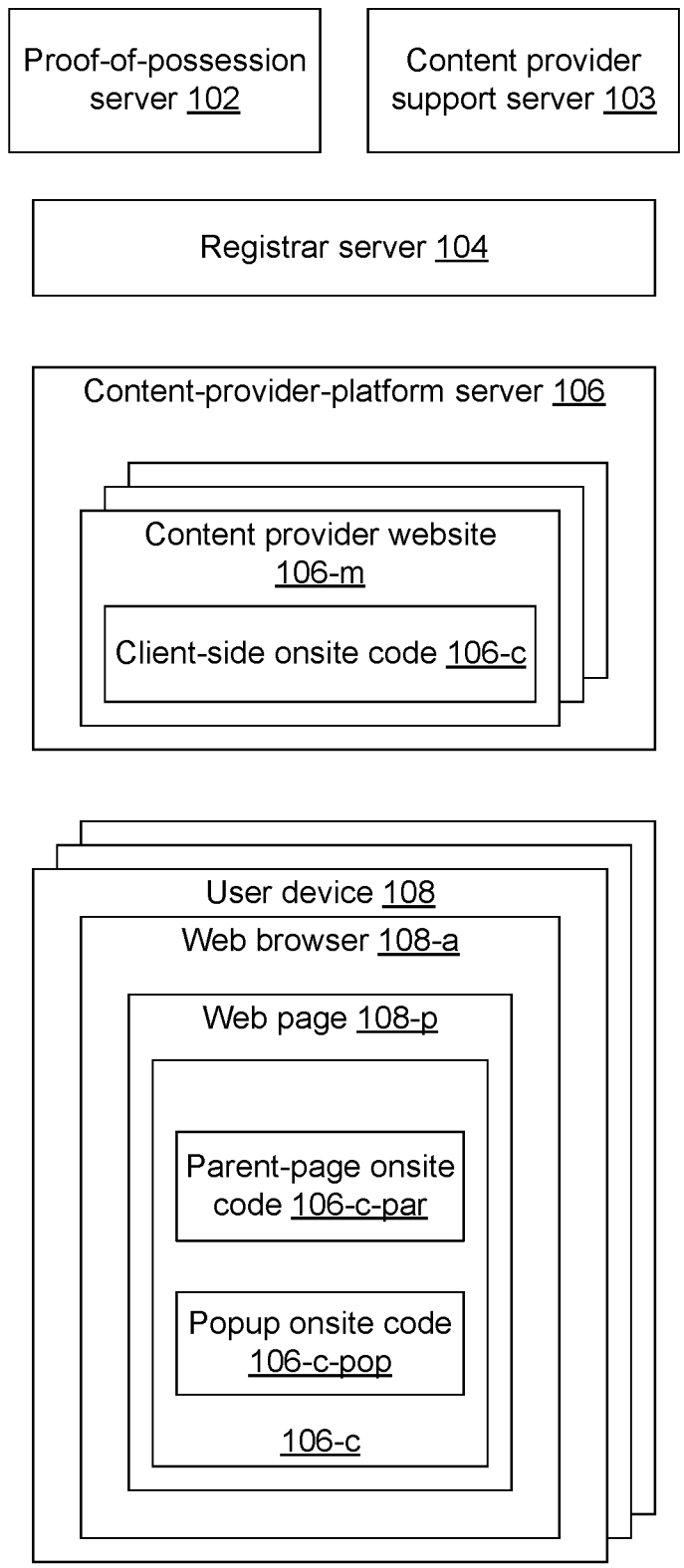
FIG. 1 shows an example system implementing technology described in this specification.

As shown in FIG. 1, an example system includes a proof-of-possession server ("POP server") 102, a content provider support server ("support server") 103, a registrar server 104, a content-provider-platform server 106, all for interacting with clients, i.e., client software running on user devices 108. An example of a registrar server 104 is the server operated by any cellular service provider. An example of a content-provider-platform server 106 is a server supporting content-providing websites operated by content providers, e.g., ones operated by a news organization, a social media company, a company that does information retrieval, a merchant, or an e-commerce company. In some implementations, the proof of possession function and the content provider support functions of the POP and support servers 102 and 103 are provided by a combined server. Each of the foregoing servers can be implemented on one or more computers in one or more locations, and multiple computers implementing a server can be coupled to communicate over a digital data communication network.

Examples of a user device 108 includes a smartphone that has a web browser and a desktop computer that has a web browser.

The content-provider-platform server 106 is a platform that hosts one or more, and generally hosts many, content provider websites 106-$m$. One or more of the respective web pages, i.e., HTML documents, of each website 106-$m$ each include what this specification will refer to as onsite code 106-$c$. The onsite code 106-$c$ implements processes that are performed when the web pages that contain the code are rendered by web browsers 108-$a$ on their respective user devices 108. The onsite code 106-$c$ may have been provided to the content-provider-platform server 106 and by that server added to the website pages. Or the onsite code may have been provided to the respective content provider operators and included by them in their web pages. The respective onsite code 106-$c$ of web pages 108-$p$ is run, i.e., is executed or interpreted, on the respective user device 108 by its web browser 108-$a$. The onsite code 106-$c$ generally includes code 106-$c$-par embedded in a parent HTML page, and code 106-$c$-pop embedded in a popup HTML page. For simplicity, these may be referred to as parent onsite code and popup onsite code when it is necessary to distinguish them. The parent onsite code and the popup onsite code may be referred to collectively as the onsite code.

The onsite code can be implemented in JavaScript or other suitable language and can be provided to the content providers for their respective websites 106$m$ or to the content-provider-platform server 106 in the form of library code of an onsite SDK. JavaScript code can be included in an HTML document as one or more of inline JavaScript, internal JavaScript, or external JavaScript, which is JavaScript obtained by the page from an external resource, e.g., a network-accessible JavaScript file.

The onsite code contains instructions that, when executed and/or interpreted, work in conjunction with a corresponding server using APIs of the server to perform their respective tasks. For example, the onsite code works with the POP server 102 to detect one or more user engagements that trigger a call-to-action popup and, furthermore, to complete a related transaction with the content provider in response to a user selection of a call-to-action icon on the popup. The onsite code also works with the registrar server 104 to complete proof of possession.

Generally speaking, a call to action to subscribe to content will usually but not necessarily include one or more incentives, e.g., VIP status, free subscription for a limited time, a discount, or cashback, that a content provider offers in exchange for subscription. A popup is a pane or banner, generally a small one, that is launched from and appears in the foreground while a user is viewing an underlying web page, which will be referred to as the parent web page. The call-to-action popup can be any form of popup, e.g., a bar popup, a popup box, a lightbox popup, a full-screen popup, or a slide-in box. The call-to-action popup presents, among other things, a call-to-action icon, e.g., a user interface button or other element that a user can select to respond affirmatively to the call to action presented in the call-to-action popup, e.g., to accept a transaction presented on the popup.

The system or a server on the system optionally includes tools, e.g., a popup editor, for receiving input specifying popup criteria, functionalities, or appearance.

The transaction with the content provider can result from an engagement by a user using the user device 108 with a digital resource of the content provider, e.g., with a content provider website 106-m hosted on the content provider 106 or elsewhere.

Figure 2:
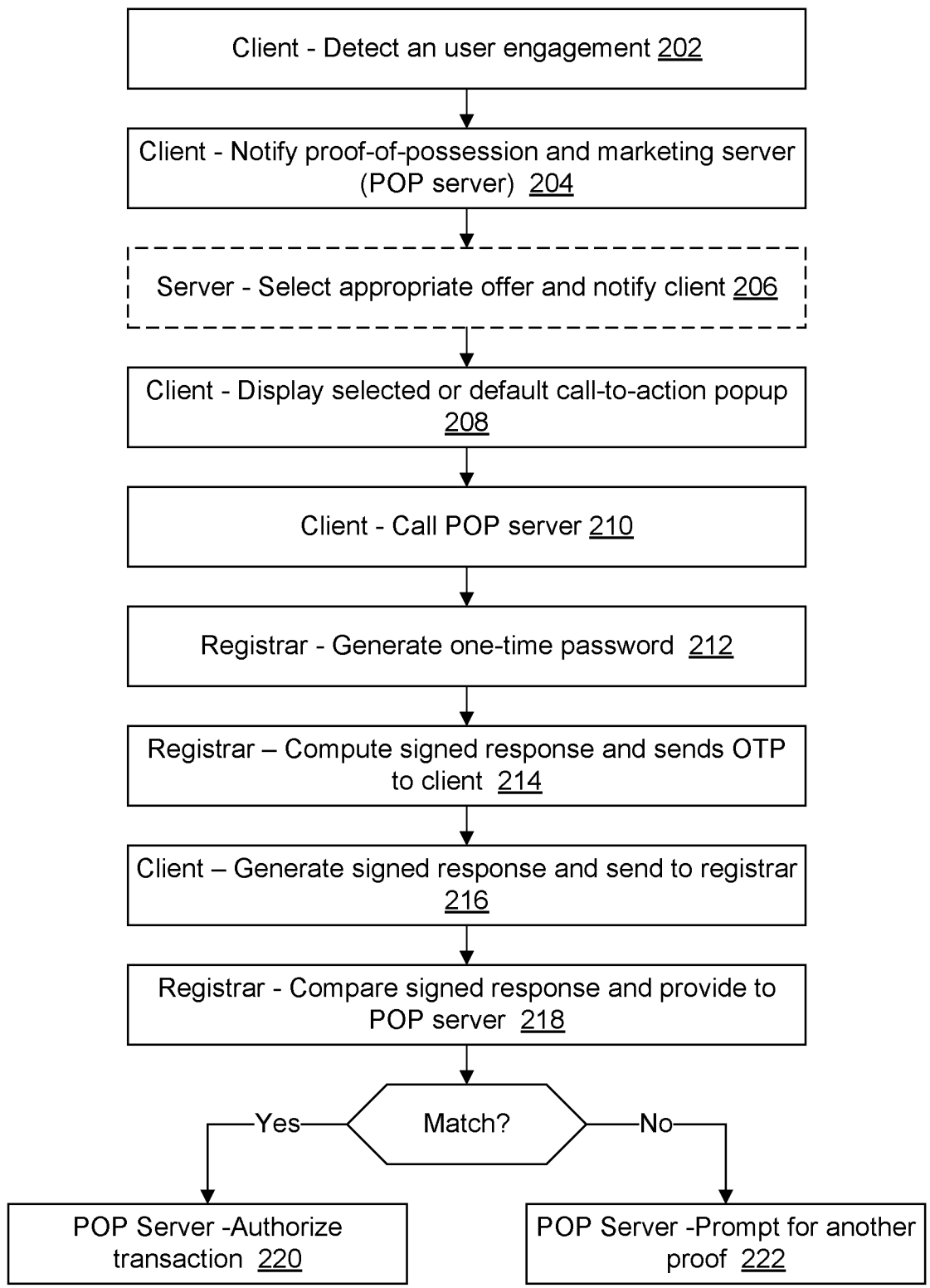
FIG. 2 shows an example method for proving endpoint possession in accordance with technology described in this specification.

FIG. 2 shows an example method that implements technologies described in this specification to prove possession of a network endpoint, e.g., a mobile phone number, for content subscription while mitigating latency. For example, a user may use a web browser on her user device 108 to browse a shopping website or other content provider website 106-m hosted by the content-provider-platform server 106. During this session the user navigates to various web pages of the website to seek items of interest.

In this context, this specification uses the term "client," when no other meaning is specified, to refer to the onsite code and any other code, e.g., JavaScript code, included in the web pages provided to a web browser by the relevant content provider website 106-m.

The client detects (step 202) a user engagement that qualifies for a call-to-action popup, e.g., the placement of an item into a shopping cart of a merchant. Other user engagements may also qualify, e.g., simply navigating to a particular content provider web page of interest.

The client notifies (step 204) the POP server 102 that it has detected a qualifying user engagement event and also grabs and sends to POP server 102 session identifying and other information, e.g., one or more of a device ID of user device 108, a session ID of the current HTTP session, and session cookies, and optionally geolocation information of the user device 108, a user name of the user of the user device 108, and/or shopping cart information or the like.

Optionally, the client requests, on page load, data describing all available popups for a current web page from the POP server 102 and then, once the data is received, evaluates user engagements and selects the appropriate popup to show. Alternatively, the POP server 102 selects (step 206) an appropriate offer, based on the session information, and notifies the client about its selection so that the latter can render a popup presenting a transaction corresponding to the offer for the user to accept.

The client displays the selected call-to-action popup (step 208), which may offer, for example, a discount of 10% in exchange for a subscription to receive SMS marketing messages on the user device 108. If optional step 206 was not performed, then the user device 108 selects a popup and transaction to present.

Upon detection of a user selection of the call-to-action icon, the client calls a proof of possession service (step 210), which can be provided by an appropriate registrar, for example, a cellular service provider. In this case, the client provides a SIM or eSIM ID (identifier) of the user device 108 along with the call. Here, the onsite code on the user device 108 has instructions to receive an OTP that will be provided, e.g., by a registrar, retrieve the ID from the onboard SIM, and use it to generate a signed response using the same one-way hash function that the registrar uses. Alternatively, the proof of possession service is implemented on the POP server 102.

Optionally, the client calls the proof of possession service speculatively, i.e., before detecting a user selection, which the client does based on a prediction that a likelihood that the user will make the user selection satisfies a prediction threshold. In one implementation, the prediction is performed by a machine learning model that predicts the probability of user selection based on current session information as well as logged information, anonymized where necessary. Input signals to the model include previous selections made by the user, previous selections made by users determined to be similar by collaborative filtering, and/or user engagements in the current browsing session indicative of intent to subscribe.

Responsive to the call, the registrar uses the SIM ID to retrieve a security key linked to the user's account—both were assigned when the user registered the mobile device—and generates an OTP (step 212). The OTP can be a 128-bit or larger random or pseudo-random number. The registrar computes a signed response by inputting the OTP and the security key into a one-way hash function (step 214).

The registrar sends (step 214) the OTP to the user device, which then uses (i) the security key onboard its SIM and (ii) the OTP as input to the one-way hash function, to generate its own signed response, which it sends (step 216) to the registrar.

The registrar compares (step 218) its signed response with the signed response received from the user device 108 and provides the POP server 102 with the result. If the result was a match, which indicates that the security keys are the same, then the POP server 102 authorizes the transaction and subscribes the user's network endpoint, e.g., phone number, to receive promotional messages from the merchant (step 220). Otherwise, the POP server 102 prompts the user device 108 to try again or use another proof of possession method (step 222).

If the result was a match, the POP server 102 then (1) stores the user's opt-in information for compliance purposes and (2) opts the user into an SMS marketing program of the merchant or other content provider, which generally includes sending the user an introductory text, which can be configured by the merchant or other content provider on the POP server 102 platform. Otherwise, the user is not registered as a subscriber.

Figure 3:
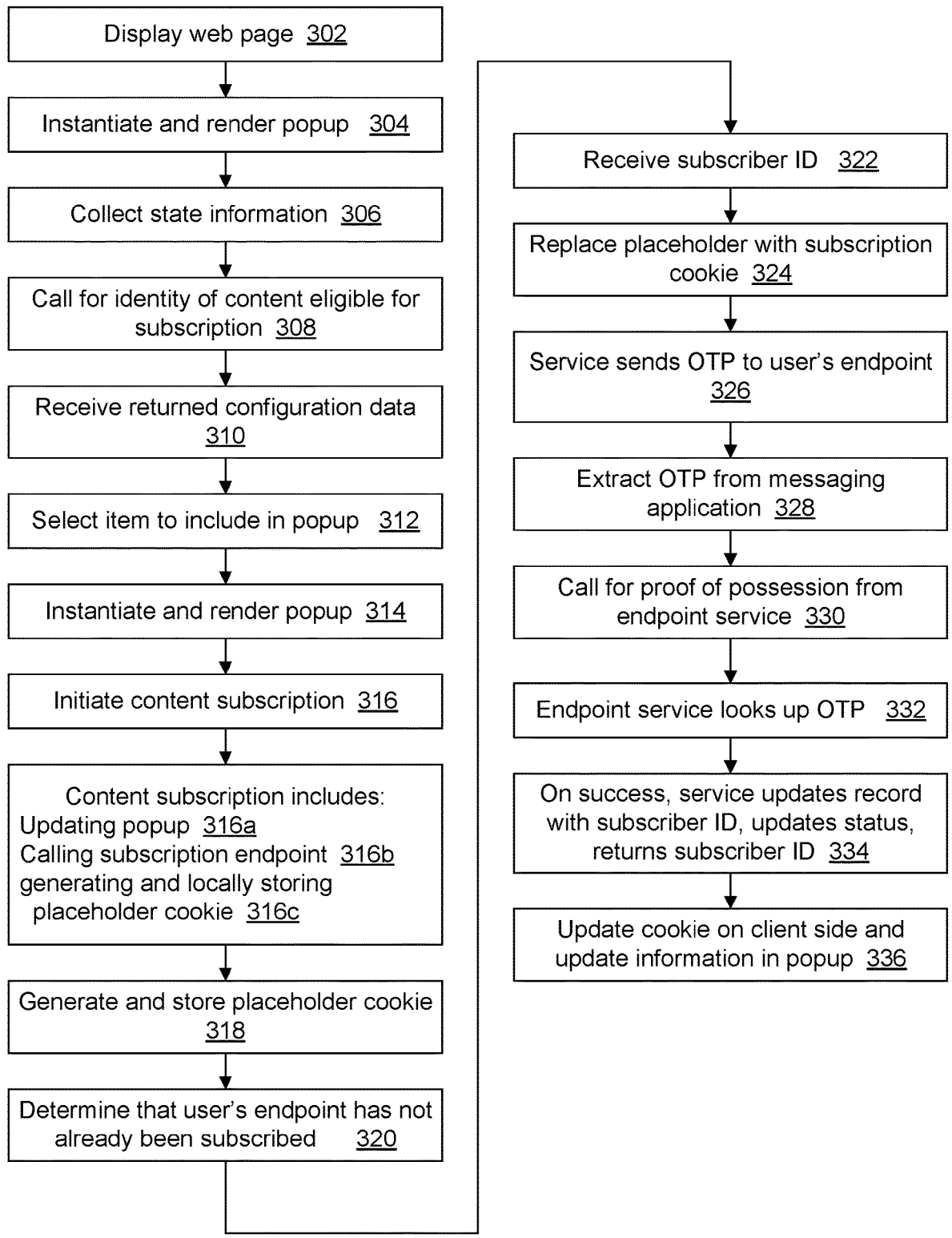
FIG. 3 shows an example method for proving possession as part of content subscription.

FIG. 3 shows an example computer-implemented method for proving consent and end-point possession for a user to subscribe to content during an online browsing session, responsive to a generation and display of a popup.

In this example, the popup is a window that overlays a parent window in a display of a user device. The parent window can be a content provider's rendered web page, which can be generated and rendered, e.g., by a client-device web browser retrieving and interpreting an HTML document of the content provider. The popup can be rendered in an iFrame implemented with an iFrame element included in script tags that are embedded in the HTML document.

Included in the iFrame element and/or script tags are computer instructions executable and/or interpretable by the browser, some or all of which instructions can be referenced and accessed over a network from sources external to the HTML document, e.g., from the support server 103. The instructions can include ones that implement cookie logic, e.g., rule-based decisions based on the presence or absence of cookies or decisions to generate or not to generate a cookie, ones that call services needed to effectuate the content subscription, e.g., proof of consent and proof of possession, ones for receiving and forwarding user input, e.g., a mobile phone number and an OTP, and/or ones that effectuate rewards and other incentives. Optionally included are parameters, e.g., content provider ID, cookie values, merchant ID, feature flags, and/or UTM (Urchin Tracking Module) parameters, which are usually appended to resource references, e.g., to the URLs, of content and/or other computing resources called by the instructions. UTMs can describe its resource reference's purpose, source, content, and/or placement, among other information. In some implementations, onsite code uses query string parameters to share data between parent onsite code processes and popup onsite code processes.

These instructions and parameters, as well as other resources included in the iFrame element and/or the script tags, together define the one or more processes that the browser performs, e.g., executes and/or interprets, to offer and complete the content subscription specified in the popup. Because the processes are able to complete content subscription without navigating away from the parent web page and/or the popup, they are said to execute onsite. They can be completed, for example, without the browser having to navigate away from the parent web page and the popup, or without the user having to switch from the browser to another application, even if the process to complete the subscription includes a call to remote endpoints for services. Being able to complete content subscription onsite reduces confusion the user may endure when too many windows and/or tabs are displayed during the process or when having to swap between them.

Moreover, HTML parameters can be lost when the user navigates the web browser away from a web page, e.g., the parent web page or the popup, which can happen when another URL is inputted into the browser address bar or when a link is clicked. With onsite processes, UTM parameters, as well as other HTML parameters and session information, are preserved, at least until completion of processes needed to complete content subscription, which is usually the period when they are needed or can be useful to provide context, among other things. Preserving this information advantageously enables the customization and specificity of information displayed in the popup, e.g., a message like "You have successfully subscribed to receive alerts and score updates," after the user has responded to "Subscribe here to receive alerts of score updates;" or "You will now get notifications for trending posts" after the user has responded to "Get notifications for trending posts;" or "Success and the 10% discount has been applied to your shopping cart" after the user has responded to "Subscribe to get notifications for sales and get 10% off now," which messages otherwise would usually be a conventional and generic "You have subscribed."

As shown in FIG. 3, the browser running on the user device executing and/or interpreting computer instructions of an HTML document displays (step 302) a web page 108-$p$ of the content provider. The HTML document includes onsite code, which was described above. The onsite code instructions perform onsite processes to provide functionality for the parent web page. In some implementations, the onsite code is provided by the support server 103 to the content-provide-platform server 106 or to content providers to include in content provider web pages. The onsite code may include an iFrame element to instantiate a popup. The popup onsite code instructions perform processes to provide functionality for the popup. Parent-page onsite code instructions of the HTML documents, perform processes of the parent web page.

These onsite code processes, during the performance of their respective functions, will make one or more API calls to various endpoints of servers and, furthermore, will usually generate cookies to reflect a current state of progress or completion of the processes, as further described below. Moreover when an iFrame element is used to implement the popup, onsite processes of the parent web page and those of the popup onsite code usually need to exchange information with each other, which cross-domain communication can be safely implemented, for example, by using the window.postMessage( ) method of HTML 5.

Notably, there are suitable alternatives to iFrame elements, e.g., HTML <embed> and <object> tags or web components. With these alternatives, onsite code performs its processes on just one domain rather than two, i.e., just the parent web page URL rather than the popup URL and the parent web page URL. There is thus no need for the processes to share data across domains, and one advantageously need not rely on the window.postMessage( ) method of HTML 5 or other similar tools. However, with just one domain, encapsulation may be necessary to ensure the popup has the styling preferences and rules specified by the content provider, which otherwise can be affected by those of the parent web page. Encapsulation further ensures that these style preferences and rules do not leak into the parent web page or other HTML components and taint their appearances. One suitable technique for encapsulation is a shadow DOM (domain object model), details of which are described in the DOM Living Standard document published by the Web Hypertext Application Technology Working Group (WHATWG) and found at https://dom.spec.whatwg.org/.

In response to detecting one or more predetermined events, for example, the user navigating to the web page of the content provider, a mouse over content of interest, and/or a user action to put a product into a shopping cart, the processes of the parent web page perform by the browser launch one or more onsite processes to instantiate and render a popup for display (step 304) that includes a call to action, for example, to subscribe to content.

The onsite processes performed by the browser collect appropriate state information that is currently available, either locally or remotely (step 306). State information can include current browsing session information, for example, session cookies, URL, HTML parameters, including UTM parameters identifying the content provider, device ID, content ID, other IDs, and/or traffic sources to a current web page. Here, appropriate state information is information that is needed to complete content subscription and its related transactions, and for which there is proper user consent to collect, as specified in browser and mobile device settings.

The onsite processes call an endpoint of the server for a service that generates, dynamically or otherwise, data identifying eligible content available for subscription (step 308). State information collected can be sent as part of the call to the service, if needed. The service may be implemented by, for example, the content-provider-platform 106, or by the individual content providers, e.g., on their respective websites 106-$m$. Optionally, there are two endpoints that can be called, one that provides services for desktop devices and the other that provides services for mobile devices.

Server-side, the called endpoint service generates configuration data, which includes availability data describing content currently available for subscription by the user, which is then returned to the onsite processes (step 310). The endpoint service can identify, from all the available content, the particular content that is available to the user, based on the state information received with the call from the browser, rules for content distribution, e.g., those specifying the what, when, and how of distribution, and/or information in logs stored server-side, e.g., user engagement logs. Generating the availability data can further be based on information provided by the content provider in one or more content status resources that specify, e.g., what content is currently available from the content provider for subscription. The content status resources are generated by, or based on input from, the content provider.

As an example of content availability and selection, if the user had previously subscribed to a first set of content, but not a second or third set currently available for subscription, and the second set is unavailable to the user based on geolocation or because of another reason, then the endpoint service would include only the third set of content in the configuration data. Examples of content sets include notifications of trending topics, alerts of events in sports, or different marketing campaigns. In another example of content availability and selection, the endpoint service checks specific content availability by looking up the URL of the parent web page against a list of prohibited URLs. One example of specific content is a particular popup of a particular content provider that specifies a particular content subscription. If the URL is on the prohibited list, then the endpoint service excludes this specific content from the configuration data.

Depending on scale, content selection can impose too heavy a burden on computing resources if done server-side. In this case, the called endpoint service returns all content available from the content provider for subscription, and the onsite code selects the content to be presented in the popup.

The configuration data may also include preferences of the content provider, e.g., the style and other appearance of the popup, messages customized by the content provider, e.g., notifications and alerts, as well as messages for a particular marketing campaign, and rules defined by the content provider, any or all of which can be returned to the browser with the availability data describing content available for subscription.

Optionally, the configuration data includes information about one or more rewards that the content provider currently offers as an incentive for the user to subscribe to its content or otherwise respond to its call to action. A reward can be, for example, free subscription for a limited time, VIP status that unlocks exclusive benefits, a discount code, and/or cashback with a purchase. With this option, there are now two transactions that will be described in the popup and, furthermore, that are to be completed onsite by the onsite processes. Specifically, the two transactions are (i) the subscription to content and (ii) the proffering and giving of the reward. Under this option, the called endpoint service would include information describing the rewards when it returns the list to the onsite processes. To prevent fraud, the actual codes for the rewards, e.g., the redeemable discount code or cashback code, are not returned until content subscription is completed.

Notably, the configuration data can be made available in networked resources that can have their respective URLs and HTML parameters. Moreover, these resources can include references to external networked resources, including remote endpoints hosted on third-party servers. The above mentioned customized notifications, alerts, and messages, as well as reward information, hence can be network accessible files that in turn have their own respective URLs and HTML parameters that can be called by the onsite processes.

All or a portion of the configuration data can be provided through user interface and other tools, e.g., a popup editor, implemented on the support server 103. These tools can be used by content providers to define elements of the configuration data and define the messages, the rewards, and the calls to action of the popups on their websites, and to format and store this data for use by the onsite code 106-*c*.

Responsive to receipt of the configuration data and any related information returned by the called endpoint service, the onsite processes select an item on the list to include in the popup (step 312). Specifically, the onsite processes select the content to be offered for subscription. Selection is based on the collected state information, which may have been updated because cookies may have changed since the loading of the page, as well as other information depending on availability and latency. Optionally, the onsite processes can also select one or more rewards to be offered in exchange for content subscription. When more than one reward is selected, they are presented in the popup for user selection.

The onsite processes instantiate and render, for display on a user interface of the mobile device, a popup that describes the call to action to subscribe to content, and, optionally, any associated reward, all done as specified by the configuration data (step 314). Alternatively, the call to action can request the actions of providing feedback or completing a survey. Initiated by popup instantiation, popup onsite code processes perform their respective tasks onsite to complete content subscription, which includes proof of consent and requires proof of possession. Optionally, the popup onsite code processes also complete the giving of any reward, which is conditioned on completion of content subscription.

The instantiated and rendered popup is dynamic and customized. The popup hence can include multiple customized messages, including one that describes the particular content available for subscription and, optionally, any associated rewards currently offered by the content provider in exchange for subscription, ones that requests under input, and ones that indicate completion of content subscription and reward giving. The parameters underlying this customization are preserved because the parent web page and the popup are preserved during the onsite subscription and proof of possession processes described in this specification.

The popup generally also includes an input field to receive user input specifying an endpoint at which subscribed content can be received, e.g., a social media account ID, an email, and/or a mobile phone number. For the latter, there is an optional autofill attribute included with instructions of the iFrame element from which the popup is instantiated. Having the autofill, also known as autocompletion, attribute saves the user from having to key in the user's phone number digit by digit.

If latency is of concern, information needed for the popup can be pre-fetched, e.g., when the parent web page starts to load, rather than waiting for loading to complete or for other qualifying events.

As shown in FIG. 3, responsive to receiving the user's endpoint, the popup onsite code processes initiate content subscription (step 316). Content subscription includes: (i) updating the popup (step 316*a*), which now optionally has an input field to receive an OTP, e.g., from the user, (ii) calling an endpoint of the server that provides content subscription service (step 316*b*) and (iii) optionally generating and storing locally a place-holder cookie that indicates content subscription has been requested, but not yet completed (step 316*c*). Content subscription is conditioned on proof of endpoint possession. Optionally, content subscription also includes giving a reward as specified in the popup, which can be strictly conditioned on completion of content subscription.

The call to the endpoint service for content subscription includes the user's endpoint and the content provider ID. The user's endpoint can be obtained as user input in the popup. The content provider ID is obtained from the parent web page, e.g., from a query string parameter in the web page document, e.g., in a script that loads the onsite code. The popup onsite process can extract the parameter from the web page and set it as a query string parameter on the popup iFrame. Then the popup onsite code can extract the provider ID and use it for the verification call.

Optionally, also included with the call is a content ID for a first set of content if the content provider currently offers multiple popups that respectively call for subscription to different sets of content, and the user has already subscribed to the first set. Including content IDs for subscribed content precludes the content subscription service form including subscribed content in the configuration data it returns to the call, which prevents popups that call for subscription to already subscribed content.

Note that parameter extraction can be done anytime during the content subscription process because there is no need to navigate the browser away from the parent web page and hence parameters are preserved. For example, the popup onsite code can extract all the parameters needed for content subscription only once at the time the popup is instantiated. Alternatively, the popup onsite code can extract parameters multiple times, on an as-needed basis. The onsite code can extract the content provider ID, for example, right before making the call to the server endpoint.

Responsive to receiving the call from the popup onsite code processes, the called endpoint service for content subscription that runs server-side checks its lists of endpoints subscribed to the content provider to determine whether the user's endpoint has not already been subscribed to receive the content specified by the popup (decision step 318). If the user has already been subscribed, the called service retrieves the subscriber ID from its lists and returns it to the popup onsite code processes (step 320), which then generates a subscription cookie (step 322) and proceeds with its other tasks, including instantiating and rendering a notification that the user has already been subscribed (step 324).

If the user has not already been subscribed, the called service: (i) generates a temporary record of the user endpoint in its lists of endpoints subscribed to the content provider, which status is pending, and which can include session information that proves consent, (ii) generates an OTP that is stored and linked to the user endpoint and the content provider ID, and (iii) sends the OTP to the user endpoint (step 326). Optionally and as an alternative to generating a place-holder cookie in step 316c, the called service returns a token to the onsite code when it sends the OTP to the user endpoint. The onsite code then uses this token to set the place-holder cookie to indicate that content subscription has been requested.

When the endpoint is a mobile number that can receive SMS messages and content being subscribed to is sent via SMS messages, the source phone number from which the OTP is sent to the endpoint is optionally a particular phone number consistently used to send and receive text messages, which consistent use mitigates problems caused by false-positive spam filtering. Sending text messages to the user from different phone numbers results, for example, in a greater chance that a SMS messaging application on the mobile device would erroneously filter the OTP message or other messages needed to complete proof of consent and/or possession as spam, which would prevent completion of complete content subscription and/or reward implementation.

On receipt of the OTP at the application associated with the user endpoint, e.g., a SMS messaging application, the popup onsite code process—leveraging functionalities of the browser and its underlying operating system—extracts the received OTP from the messaging application and autofills the OTP input field, optionally without user action (step 328). When user input is preferred, submission can be completed with a simple user click on the OTP displayed in a suggest bar on top of a virtual keyboard. Here, there is no need for the user to navigate away from the browser to the mobile application to retrieve the OTP.

Alternatively, no OTP input field is displayed, and the popup onsite code process obtains the received OTP by leveraging the autofill functionality as described above, except that the popup does not display an OTP input field that needs to be filled.

In the event that autofill does not work, the user may need to swap applications to retrieve the OTP, specifically from the browser to the mobile application associated with the user's endpoint. The user must then manually input the OTP, by key entry or by cut and paste, into the input field of the popup. But even under these unhappy circumstances, there is still no need for the browser to navigate to a URL different from that of the parent web page and/or the popup and thus HTML parameters, properties, and attributes would be preserved and available for extraction by the popup onsite code processes.

Once it has the OTP, extracted programmatically or manually provided, the popup onsite code processes call a server-side endpoint service for proof of possession (step 330). The call includes the user's endpoint, the content provider ID, and the OTP code that was extracted from the mobile application.

Responsive to the call, the called service looks up the OTP by user endpoint and content provider ID (step 332), which was stored in step 326. If the generated code does not match the submitted code, the service returns an error code to the calling popup onsite code processes, which then can select other options to prove possession. Otherwise, the called service updates the temporary record with a subscriber ID, updates its status from pending to completed, and returns the subscriber ID to the calling popup onsite code processes (step 332). When an optional reward is given in exchange for subscription, the called service also returns a code needed to redeem the reward. This code can be randomly or pseudo-randomly generated or otherwise so as to be unique. Moreover, the called service can start sending the subscribed content, e.g., a welcome message, to the user's verified endpoint, which can be done as specified by the content provider and synchronized so that the welcome message is sent only after the popup onsite code has displayed the success message for content subscription or, if there is a reward, after auto application of the reward.

Upon receipt of the subscriber ID, which indicates successful proof of possession and content subscription, the popup onsite code processes (i) replace the placeholder cookie with one that includes the subscriber ID thereby updating subscription status; (ii) provide the code needed to redeem the reward to the user, when there is a reward; and (iii) update information displayed in the popup to indicate successful subscription to the particular content specified in step 314 and optionally to also indicate successful application of the optional reward specified in step 314 (step 334).

Figure 4:
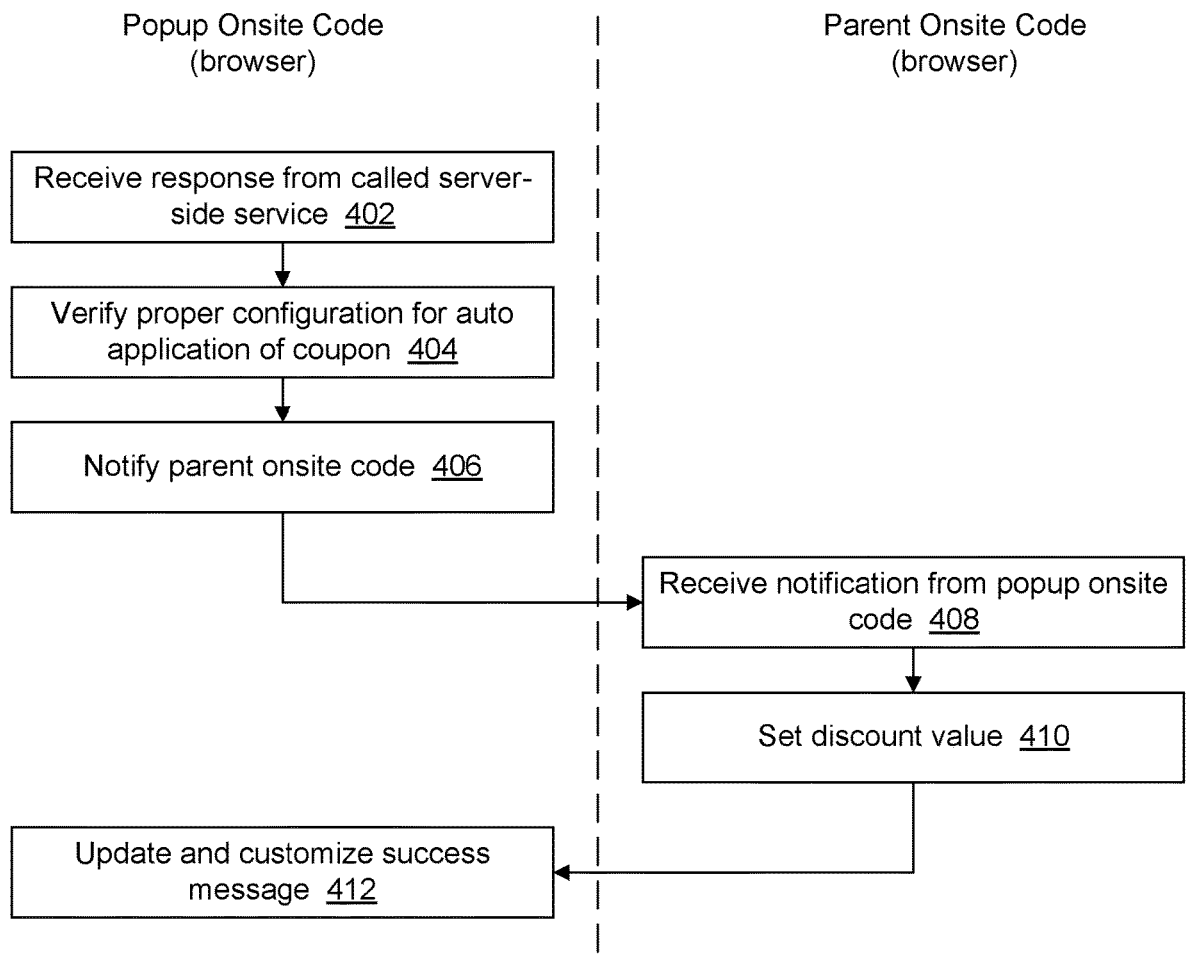
FIG. 4 shows an example client-side method for programmatically applying rewards responsive to onsite content subscription.
Figure 5:
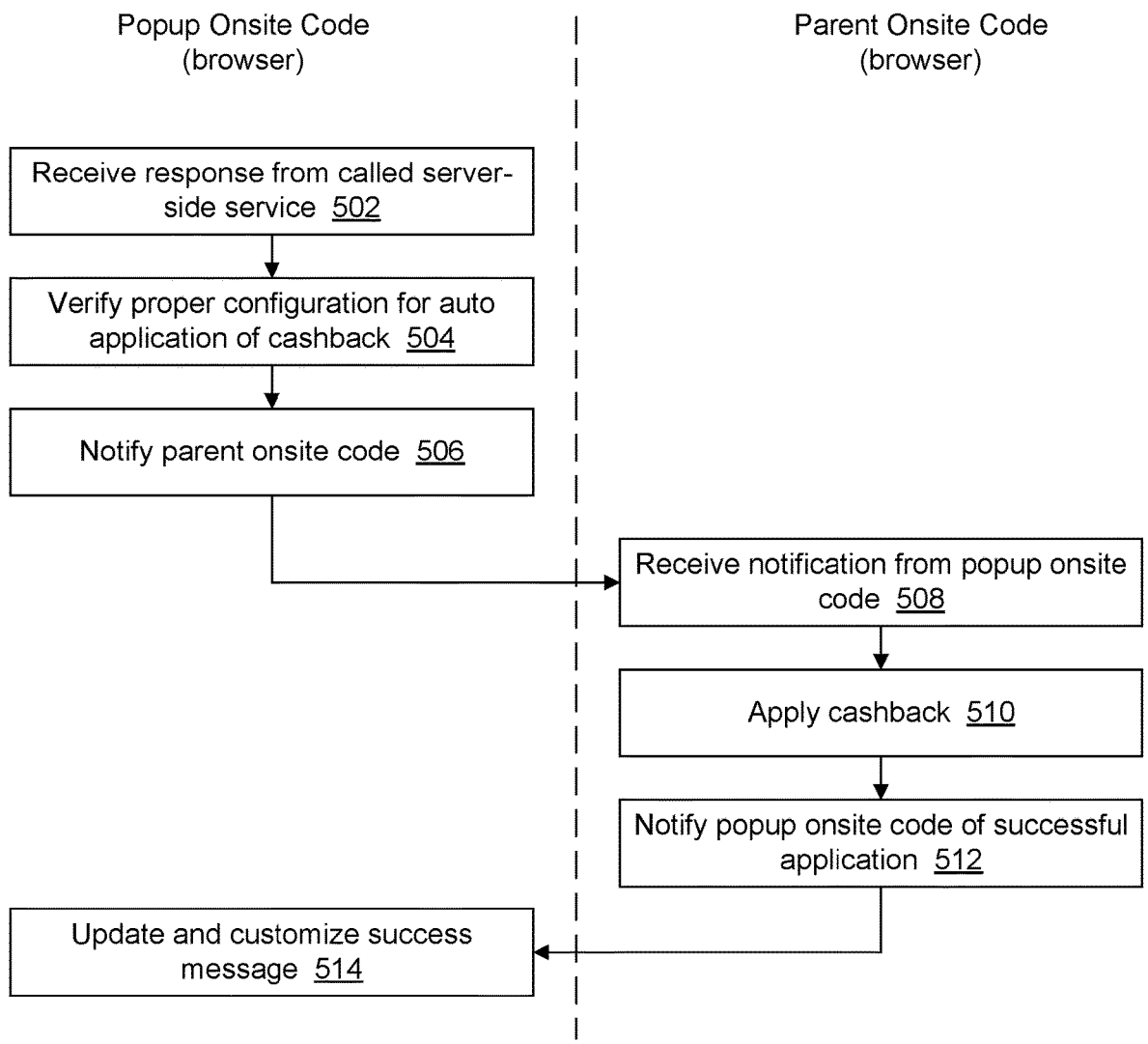
FIG. 5 shows another example client-side method for programmatically applying rewards responsive to onsite content subscription.

FIGS. 4 and 5 are sequence diagrams that respectively depict examples of auto application of discounts and cash-back responsive to successful proof of possession, both of which can be completed onsite and, furthermore, included as part of the method described above in reference to FIG. 3. In these examples, popups are implemented with iFrames, and so onsite processes are performed across two domains, that of the parent web page and that of the popup. Auto application, or automatic application, means that the application of the reward or cashback occurs without requiring further user action, so that when the user navigates to the cart, for example, she would see that the discount has been applied or that the cashback is available.

For circumstances when the reward is a discount that needs to be applied to a shopping cart on the parent web page, the popup onsite code processes provide the discount code to the processes of the parent web page that performs shopping cart functions, which can be done, e.g., with the postMessage( ) method. The latter processes can then validate the discount code and automatically apply it to the shopping cart, i.e., without requiring further user action for the user to get the discount, so that when the user navigates to the cart, she would see that the discount has been applied. Notably, auto application of the reward can be initiated without having to wait for a next page refresh.

And under circumstances when it would be necessary or useful for the content provider to know from which digital property the user navigated to the parent web page, e.g., for traffic and/or advertising analytics, the popup onsite code processes can extract the appropriate UTMs from the parent web page, which is possible because the content subscription was completed onsite, and send it to the server to append to its content subscription lists.

As shown in FIG. 4, the popup onsite code receives a response from the called server-side service for content subscription, which response indicates successful proof of possession and includes a discount code (step 402). The popup onsite code verifies proper configuration for auto application of the discount (step 404). Verification includes, for example, checking the popup configuration data for an indication that the content provider has authorized auto application, as well as ensuring that the coupon can be applied in the current session. The coupon can be applied, for example, when there is a shopping cart or another resource to purchase. The popup onsite code notifies the parent onsite code of the discount code, which can be done using the window.postMessage method (step 406). The discount code includes information that specifies the value of the discount. The parent onsite code receives the notification through an event listener (step 408) and sets the value of the discount in accordance with the information received (step 410), which value can be set, for example, by generating a discount cookie with the specified value. The discount can then be applied to the shopping cart, optionally by a remote service that performs shopping cart functions. When the parent web page is one that shows items that can be purchased and their pricing, the parent onsite code can optionally update the pricing shown to reflect the discount, which option can be helpful when there is no shopping cart displayed on the page, but can be performed regardless of whether there is a shopping cart displayed or not. Responsive to generating of the discount cookie, the popup onsite code updates the success message of the popup to indicate that the particular discount, including the amount, has been auto applied (step 412). Alternatively, the popup onsite code updates the success message only after receiving notification from the parent onsite code that the discount has been applied.

As shown in FIG. 5, the popup onsite code receives a response from the called server-side service for content subscription, which response indicates successful proof of possession and includes a cashback code (step 502). Optionally, cashback can be implemented as a zero-cost item that can be generated and placed into the shopping cart once content subscription has been completed. The popup onsite code verifies proper configuration for auto application of the cashback (step 504). Verification includes, for example, checking the popup configuration data for an indication that the content provider has authorized auto application, as well as ensuring that the cashback can be applied in the current session. The cashback can be applied, for example, when there is a shopping cart or another resource available to benefit from the cashback. The popup onsite code notifies the parent onsite code of the cashback code, which can be done using the window.postMessage method (step 506). The parent onsite code receives the notification about the cashback through an event listener that was registered upon instantiation of the popup (step 508). Responsive to receipt of the notification, the parent onsite code applies the cashback (step 510). Auto application of cashback, in one implementation, is the generation and addition of a zero-cost item to a shopping cart. The zero-cost item can be generated as an instance for the present user of a zero-cost item class. This digital item represents the cashback and includes a unique code that is redeemable in accordance with reward rules, which are described below. Once auto application of the cashback has been completed, the parent onsite code notifies the popup onsite code that cashback has been auto applied (step 512), and responsive to this notification, the popup onsite code updates the success message of the popup to indicate that the particular cashback, including the amount, has been auto applied (step 514).

Figure 6:
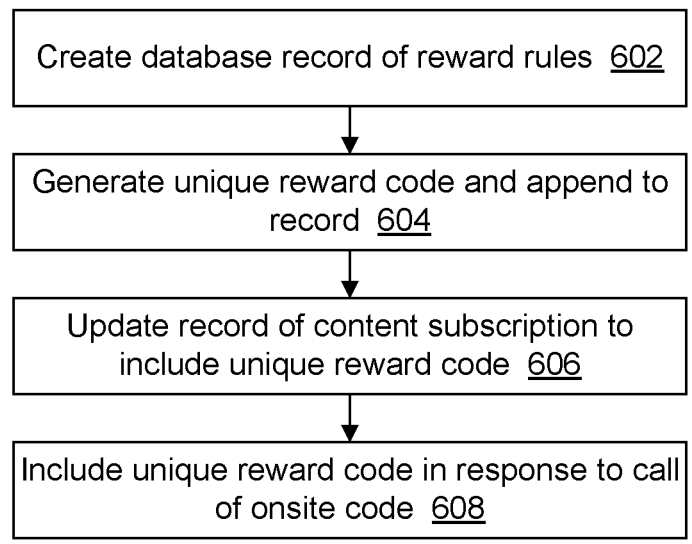
FIG. 6 shows an example server-side method for content subscription and programmatic application of rewards.

FIG. 6 shows a server-side method to auto apply rewards performed by the endpoint service, responsive to successful proof of endpoint possession. The reward is a discount coupon or cashback redeemable at a later time. This method can be an integral part of the endpoint service for content subscription described above in reference to FIG. 3.

Once the OTP received from the onsite code has been found to match the previously generated and stored OTP, the service creates a database record that specifies reward rules (step 602). The reward rules define requirements to apply the rewards, automatically or otherwise. With coupons, for example, the rules specify amount of discount, the time period when the discount may be applied, which content or other purchase items qualify for discount, a threshold purchase amount, how many times the discount may be applied per user, and/or qualifying geolocations in which the discount can be applied. With cashback, the rules specify the amount of the cashback, where it may be redeemed, and/or the time period during which it can be redeemed, e.g., after any return or exchange period has expired, but no later than six months. The reward rules are created based on input provided by the content provider, which input can be stored in popup configuration data.

Optionally, auto application of rewards can be performed by two services that have accessible endpoints at different servers. For example, the endpoint service that was called by the onsite code for content subscription and auto application of rewards runs on the content-provider-platform server 106 and calls a service to create reward rules, which in turn runs on support server 103. Here, it may be necessary to have two databases of reward rules, and both would be updated with the new record created in step 602.

As shown in FIG. 6, the server-side endpoint service that auto applies rewards generates a unique coupon code or cashback code for the generated record of reward rules (step 604). The codes are the actual ones that are redeemable. If there are two databases of reward rules, then both are updated with these codes.

The service stores the coupon or cashback code in the appropriate record on the list of endpoints subscribed to the content provider (step 606). The record now has information that includes the endpoint, content provider ID, the coupon or cashback code, and optionally content ID when the content provider offers multiple sets of content for subscription.

The service includes the discount or coupon code in the response to the calling onsite code that proof of possession and content subscription has been successfully completed (step 608). With this information, the onsite code can auto apply the discount code or the cashback code. Where onsite code operates on two domains, e.g., when iFrames elements are used, the popup onsite code would receive the information and can pass that to its parent onsite code.

Advantageously, latency can be reduced and computing process efficiencies can be improved because popup onsite code processes whose start and/or stop are conditioned on successful completion of content subscription and/or proof of possession need not rely on or wait for cookie polling, as can be the case with conventional methods. The above described process to auto apply discount code to the shopping cart (or alternatively, cashback and/or other rewards) is an example of a process that is conditioned on successful completion of proof of possession and content subscription.

Conventionally, cookie polling is customarily done when web pages are refreshed. Cookie polling can also be done independently of page refresh. Here, polling would take place periodically, e.g., every second or two, until the cookie with the subscriber ID is detected, thereby indicating successful subscription and/or proof of possession. However, cookie polling may take too long, or in some cases it never completes because for one reason or another the subscriber ID never shows up. The difficulty here is that the onsite code processes cannot reliably determine that content subscription has failed, as it may just be taking a long time to complete. During this period of uncertainty, processes are in limbo; they cannot start or stop because it is not known whether the condition prerequisite for their starting and/or stopping would occur or not.

Moreover, conventional methods for proof of possession for content subscription require the mobile application, e.g., an SMS messaging application, rather than the popup onsite code processes, to submit the OTP for verification. With conventional methods, the popup onsite code processes are out of the loop, specifically the sequence of steps that proves endpoint possession, and the most updated information about content subscription the popup onsite code processes would have is a confirmation of receipt of its call to the server-side service for content subscription. Notably, it would not have information on when the OTP was received at the mobile device or when the OTP was submitted back for verification. Hence, this conventional method imposes a period of uncertainty that can take too long or may not end, e.g., if the user does not actually hit the send button to send the OTP, which can cause processes to hang up, e.g., when they have no timeout protection. In addition, processes that may start or stop when they should not have because they relied on out of date cookies.

In contrast and because it is the popup onsite code processes, rather than the SMS messaging application, that sends the OTP to the server-side service for verification, and because the called service for proof of possession returns a response to the call directly to its caller, i.e., the popup onsite code processes, rather than another mobile application, the popup onsite code processes are literally in the loop that proves endpoint possession. Moreover, because the called service for proof of possession responds with either the subscriber ID or with an error code, and not with anything in between, the response enables the popup onsite code processes to dispositively determine whether proof of possession was successful or has failed. Uncertainty and limbo are thereby reduced significantly.

This removal of uncertainty is especially advantageous in a couple of use cases. As indicated, a content provider can have multiple popups. In this case, the content provider can assign a first popup to a homepage and a second, different popup to another web page of the site, e.g., a web page that lists products available for purchase. The second popup offers different content for subscription and/or different rewards. During the described period of uncertainty, for example when subscription to content specified by the first popup is completed server-side, but cookie polling has not been done and so the cookies that are actually present incorrectly indicate that subscription is still in progress, it is possible that the user navigates away from the home page to the product web page, which would result in instantiation of the second different popup, and user confusion would likely ensue. The onsite methods performed as described in this specification avoid this problem because cookies are updated as soon as content subscription is completed server-side, regardless of whether web pages have been refreshed or whether the user has responded to any text messages.

Moreover, the content provider can test alternative popups using A/B testing, which option can be configured and stored in configuration data. The idea behind A/B testing is to assess which of the two popups being tested is more effective, e.g., which one has a better conversion rate. Because of the described uncertainty, there is a chance that a single user is shown both popups being tested, which would defeat the purpose of the test. The onsite methods performed as described in this specification avoid this problem and thereby advantageously improve the reliability of A/B testing.

It may be counterintuitive to have the popup onsite code processes be in the loop to prove endpoint possession, because it is conventional wisdom to spare browsers from tasks that can be performed server-side or by other computing resources, and because industry standards encourage otherwise. However, the benefits mentioned above outweigh corresponding costs.

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a software module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or microcontrollers or a combination of them, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech, or tactile feedback or responses; and input from the user can be received in any form, including acoustic, speech, tactile, or eye tracking input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., on a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

While this specification contains many specific implementation details, these should not be construed as limitations on the scope of what is being claimed, which is defined by the claims themselves, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for content subscription, the system comprising a user device and a server, user device being configured to communicate with the server, the server being implemented on one or more computers, wherein:
the user device has a network endpoint and is configured with a web browser, wherein the web browser is configured with popup instructions operable to cause the web browser
to perform pop-up operations comprising:
generating a popup from a parent web page, the popup including (i) a call to action to subscribe to content at the endpoint and (ii) an end-point input field, wherein the content has an identifier (content ID) and includes SMS messages;
in response user input indicating acceptance of the call to action, calling a service on the server for content subscription and proof of endpoint possession, wherein one indication of acceptance is receipt of user input specifying the endpoint, and wherein the call to the service specifies the network endpoint and the content ID; and
obtaining a one-time passcode received at the endpoint on the user device and sending the passcode to the service; and,
in response to receiving from the service an indication of successful proof of endpoint possession, sending HTML parameters extracted from the parent web page to the service, wherein the one or more HTML parameters indicate a traffic source of the parent web page; and
the server is configured to implement the service and perform service operations comprising:
in response to the call from the browser for content subscription and proof of possession, generating a one-time passcode and sending the passcode the endpoint specified in the call;
in response to receiving a one-time passcode from the web browser, comparing the received one-time passcode with the generated one-time passcode and, if they match, (i) returning to the browser an indication that proof of possession has been completed and (ii) creating and storing a record that includes the endpoint and the content ID; and
in response to receiving the one or more HTML parameters from the browser, appending the record with the one or more HTML parameters.

2. The system of claim 1, wherein the content ID is extracted from HTML parameters of the parent web page by pop-up operations, wherein the pop-up operations further comprise:
in response to receiving the indication of successful proof of endpoint possession, (i) generating a customized description of the subscribed content based on the content ID and (ii) updating the popup to indicate successful subscription, the update including the customized description.

3. The system of claim 1, wherein the popup operations further comprise instantiating and storing locally a session cookie that (i) indicates that the endpoint has been subscribed to receive the content and (ii) precludes an additional popup that would redundantly call for subscription to the content.

4. The system of claim 1, wherein the popup operations further comprise generating and storing locally a session cookie that (i) indicates that the endpoint has been subscribed to receive the content and (ii) precludes an additional popup that calls for subscription to content different from the content specified in the popup generated.

5. The system of claim 1, wherein the call to action specifies a reward for a transaction in progress on the parent web page, and wherein:
the service operations further comprise sending a redeemable code for the reward to the browser with the indication that proof of possession has been completed; and
the pop-up operations further comprise, in response to receipt of the redeemable code for the reward, auto-applying the reward to the transaction.

6. The system of claim 5, wherein:
the reward is a discount;
the transaction in progress is a purchase for which the parent web page includes a shopping cart that has an item not yet purchase; and
the discount is auto-applied, based on the code, to items in the shopping cart.

7. The system of claim 1, wherein the call to action specifies a reward that is a discount, and wherein:
the parent web page displays one or more products for sale and their respective pricing;
the service operations further comprise sending a redeemable discount code for the discount to the browser with the indication that proof of possession has been completed; and
the pop-up operations further comprise, in response to receipt of the redeemable discount code for the reward, adjusting the displayed pricing based on the redeemable discount code.

8. The system of claim 7, wherein no shopping cart is displayed with the parent web page.

9. The system of claim 5, wherein:
the reward is cashback;
the transaction in progress includes a shopping cart displayed with the parent web page; and
the cashback is auto-applied by instantiating and adding to the shopping cart a zero-cost cashback item that includes a redeemable cashback code.

10. The system of claim 1, wherein:
the popup specifies a reward;
the service operations further comprise sending a redeemable code for the reward to the browser; and
the popup operations further comprise auto-applying the reward with the redeemable code and, on completion of the auto-applying of the reward, generating a customized description of the reward and updating the popup to indicate successful reward application, the update including the customized description.

11. The system of claim 1, wherein:
the popup is instantiated with an iFrame element and popup operations are performed across two HTML domains; and
cross domain data sharing is performed with query string parameters.

12. The system of claim 1, wherein:
the service operations further comprise sending a message to the network endpoint of the user device, the message specifying the subscribed content and indicating that content subscription can be cancelled; and
content subscription is completed without including a link in the message for the user to click or requiring a reply by the user to the message.

13. The system of claim 1, wherein the HTML parameters include UTM parameters.

14. The system of claim 1, wherein transactions described in the popup are completed onsite without navigating the browser away from the parent web page, thereby keeping the parent web page and the popup on display until content subscription is completed.

* * * * *